(12) United States Patent
Nagaya et al.

(10) Patent No.: US 7,270,525 B2
(45) Date of Patent: Sep. 18, 2007

(54) NOZZLE TOUCH MECHANISM

(75) Inventors: Motohiro Nagaya, Yamanashi (JP); Tatsuya Kawasaki, Yamanashi (JP); Nobuaki Hashimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 372 days.

(21) Appl. No.: 10/936,655

(22) Filed: Sep. 9, 2004

(65) Prior Publication Data

US 2005/0053686 A1 Mar. 10, 2005

(30) Foreign Application Priority Data

Sep. 9, 2003 (JP) ............... 2003-316709

(51) Int. Cl.
*B29C 45/80* (2006.01)
(52) U.S. Cl. ..................................... 425/149
(58) Field of Classification Search ................. 425/149
See application file for complete search history.

(56) References Cited

FOREIGN PATENT DOCUMENTS

| DE | 1529911 | 12/1969 |
|----|---------|---------|
| JP | 3-132322 | 6/1991 |
| JP | 6-17038 | 3/1994 |
| JP | 6-226787 | 8/1994 |
| JP | 10-235680 | 9/1998 |
| JP | 2000-071286 | 3/2000 |
| JP | 3153800 | 1/2001 |
| JP | 2001-170966 | 6/2001 |
| JP | 2003-62861 | 3/2003 |

*Primary Examiner*—Tim Heitbrink
(74) *Attorney, Agent, or Firm*—Drinker Biddle & Reath LLP (57) ABSTRACT

A nozzle touch mechanism which does not allow an injection unit to move back by the force of inertia at the time of acceleration of injection and prevents leakage of the molten resin. A damper is arranged between the injection unit and a stationary platen secured to a base, so as to generate a strong braking force only at the time of high acceleration of the injection unit. A ball screw is rotated by driving an electric motor to move forward a nut member screwed onto the ball screw, whereby the injection unit is moved via a spring. When the injection unit is stopped by contacting a nozzle to a metal mold, the spring is contracted. When the amount of contraction of the spring reaches a predetermined value, the motor is stopped and locked such that the nozzle touch force corresponding to the amount of contraction of the spring is generated. Even though the injection unit undergoes the force working to move back the unit due to the inertia force at the time of acceleration of the injection, the injection unit is not moved back because the damper substantially prevents the movement back of the unit and the leakage of molten resin.

9 Claims, 8 Drawing Sheets

NOZZLE TOUCH MECHANISM

BACKGROUND OF THE INVENTION

1. Field of the Invention

The present invention relates to an injection-molding machine and, particularly, to a nozzle touch mechanism for the injection-molding machine.

2. Description of the Related Art

In a nozzle touch mechanism, which moves an injection unit as a whole to bring it into contact with a metal mold, the injection unit, mounted on a base so as to move backward and forward, is driven by a nozzle touch force generating device to bring the nozzle of the injection unit into contact with the metal mold. A known nozzle touch force generating device utilizes a hydraulic cylinder or a spring force expanded by the force of a motor to hold the nozzle in contact with the metal mold (see Japanese Examined Patent Publication (Kokoku) No. 6-17038)

Figure 2:
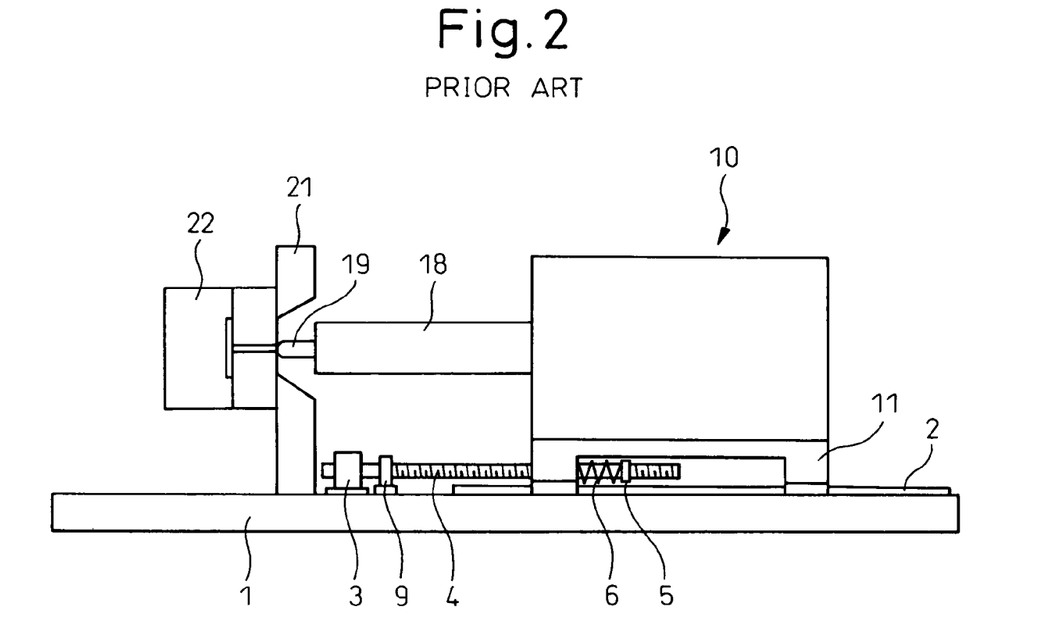
FIG. 2 is a schematic diagram illustrating a conventional nozzle touch mechanism having an electric motor and a spring.
Figure 3:
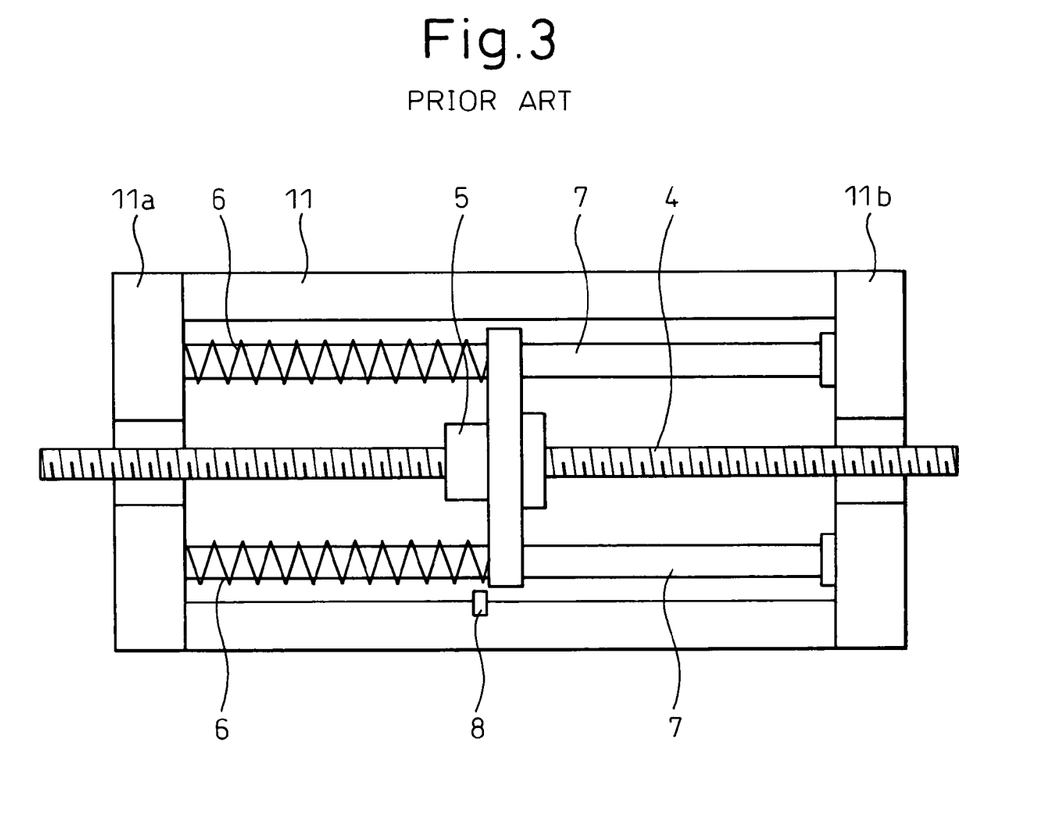
FIG. 3 is an explanatory diagram of a conventional unit base.

FIG. 2 illustrates a conventional nozzle touch mechanism using a spring as a nozzle touch force generating unit. FIG. 3 is an explanatory view of a unit base for generating the nozzle touch force. As shown, on a rail 2 provided on the base 1 of the injection-molding machine, there is arranged a unit base 11, that constitutes a portion of the injection unit 10 that can move backward and forward.

A nozzle touch force generating unit is arranged on the unit base 11. The nozzle touch force generating unit is constituted by a motor 3 secured to the base 1, a coupling member 9 secured to the base 1 for coupling the rotor shaft of the motor 3 to a ball screw 4 and for supporting the ball screw 4 maintaining the freedom of rotation but inhibiting its motion in the axial direction, a nut member 5 screwed onto the ball screw 4 and positioned between the legs 11a and 11b of the unit base 11, guide rods 7, 7 for guiding the nut member 5, and springs 6, 6 arranged between the nut member 5 and the leg 11a of the unit base 11 which undergo expansion and contraction accompanying the motion of the nut member 5. As the motor 3 is driven to rotate the ball screw 4, the nut member 5 screwed onto the ball screw 4 moves in the axial direction being guided by the guide rods 7, 7. As the nut member 5 moves forward (toward the left in FIGS. 2 and 3), the spring 6 is contracted, the unit base 11 moves forward, and the injection mechanism mounted on the unit base 11 moves forward. According to this constitution, the injection unit 10 moves forward, a nozzle 19 is brought into contact with a metal mold 22, the amount of expansion or contraction of the spring is detected by a sensor 8, and a nozzle touch force corresponding to the amount of the expansion or contraction is generated.

As described above, in the nozzle touch mechanism using the force of the spring, the nozzle touch force for holding the nozzle in contact with the metal mold is generated by the force of the spring contracted and the amount of contraction of the spring may be detected by a sensor or the like in order to control the nozzle touch force.

However, due to the shock that accompanies the injection, the amount of expansion and contraction of a spring may vary, and the sensor may obtain an erroneous detection. In order to prevent erroneous detection, therefore, there has been known an invention in which a spring that serves as a nozzle touch force accumulating means is attached between a frame and a means that converts a rotational force into a thrust, a buffer member is arranged between an injection unit and the means that converts the rotational force into the thrust, and the shock of injection is absorbed by the buffer member, i.e., an injection unit, an inter-frame buffer mechanism and a spring are arranged in series in a constitution in which the injection unit, the buffer means, a ball screw/nut mechanism (or the means for converting the rotational force into the thrust), the spring and the frame are connected together, so that the spring expands and contracts as the shock of injection is transmitted to the spring, preventing the sensor from erroneously detecting the amount of elongation or contraction of the spring (see Japanese Patent No. 3153800).

As a method not maintaining the nozzle touch force by the spring force or the hydraulic pressure, there has further been known an invention in which a hot runner device for contacting the nozzle is provided with a receiving portion for receiving a wedge block, the injection device is provided with a tilted plate for receiving the wedge block, and after the injection device is driven and moved forward by an air cylinder causing the nozzle to come in contact with the hot runner device, the wedge block is driven by the air cylinder so as to be inserted between the receiving portion and the tilted plate, and the injection device is pushed onto the hot runner device to maintain the nozzle touch force (see Japanese Unexamined Patent Publication (Kokai) No. 10-235680).

Figure 4A:
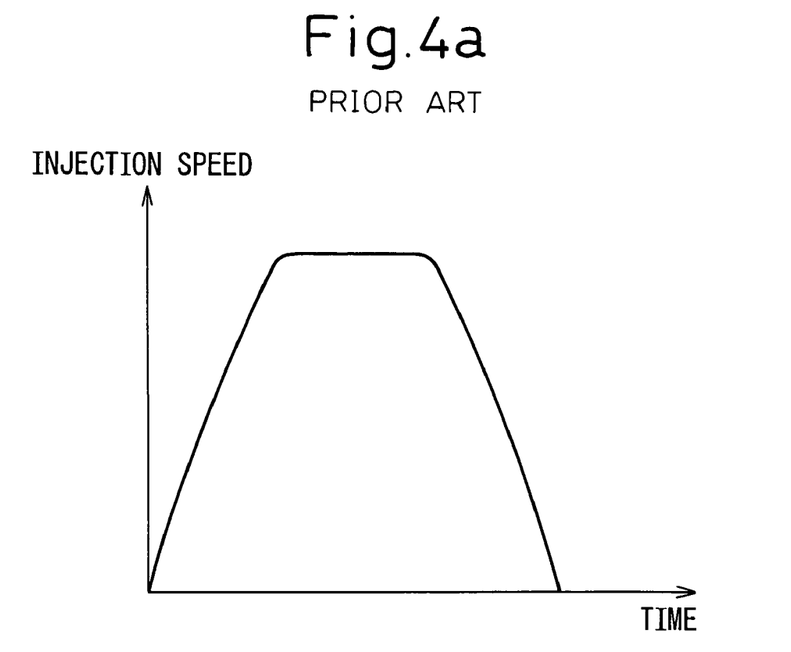
FIGS. 4a and 4b are diagrams illustrating a change in the injection speed and the nozzle touch force, respectively, in the injection operation using a conventional nozzle touch mechanism.
Figure 4B:
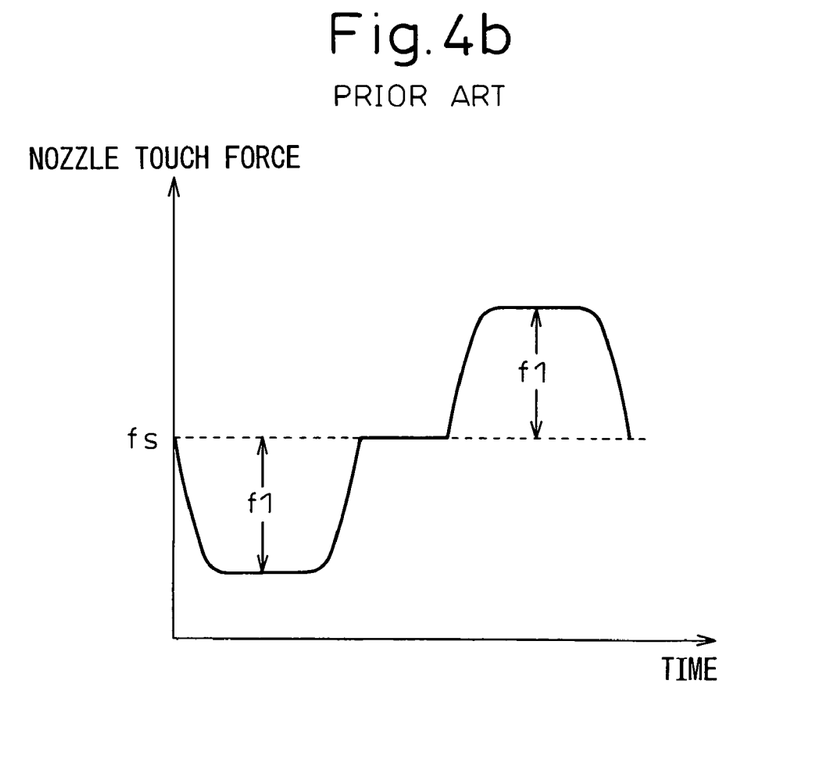

Generally, it is desired to maintain the nozzle touch force in the nozzle touch mechanism constant. However, at the time of acceleration of injection, the nozzle touch force for pushing the nozzle touch surface drops by being affected by the force of inertia of a moving part of the injection mechanism. FIGS. 4a and 4b are diagrams illustrating the nozzle touch force in a conventional nozzle touch force generating device utilizing a spring, as shown in FIGS. 2 and 3. FIG. 4a illustrates the injection speed of when an injection screw advances in the injection unit to inject the molten resin in a heating cylinder 18 into a metal mold 22, and FIG. 4b illustrates the nozzle touch force at the time of injection.

When the injection operation starts in a state where a predetermined nozzle touch force fs is generated due to the contraction of the spring 6, there occurs a drop in the nozzle touch force for pushing the nozzle touch surface at the time of acceleration of injection due to the force of inertia of moving parts such as the injection screw and a pusher plate for holding the screw in the injection unit 10. At the time of deceleration of injection, on the other hand, the nozzle touch force increases due to the force of inertia of the moving part of the injection unit 10. FIG. 4b illustrates an increase and a decrease of the nozzle touch force by f1 at the time of acceleration and deceleration of injection. The force, generated during the injection and working to move the injection unit back, is small at the time of low acceleration, but is large at the time of high acceleration.

When the nozzle touch force becomes smaller than a force produced by the resin pressure, the injection unit is pushed back permitting the resin to leak. So far, therefore, the nozzle touch surface had been pushed with a sufficiently large nozzle touch force so that there was no leakage of resin despite the nozzle touch force has dropped being affected by the acceleration of injection. When pushed with a large nozzle touch force, however, the metal mold deflects and/or the parallel accuracy of the mold is not maintained causing problems in regard to a drop in the quality of the molded article and a decrease in the life of the metal mold.

SUMMARY OF THE INVENTION

It is therefore an object of the present invention to overcome the above problem and to provide a nozzle touch mechanism which can generate a desired nozzle touch force and can prevent leakage of the molten resin.

A nozzle touch mechanism provided by the present invention is one for an injection-molding machine having a base and an injection unit arranged on the base so as to move backward and forward, and comprises a nozzle touch force generating unit positioned between the injection unit and the base for imparting a nozzle touch force to the injection unit, and a movement-preventing unit which substantially prevents the movement of the injection unit when a reaction force larger than the output of the nozzle touch force generating unit is imparted to the injection unit.

The movement-preventing unit may include a damper positioned between the injection unit and the base or a member secured to the base for connecting the injection unit to the base or the member. Alternatively, the movement-preventing unit may comprise a damper positioned between the injection unit and the base, and parallel to the nozzle touch force generating unit.

The damper may generate the braking force corresponding to a moving back speed of the injection unit which is generated at the time of acceleration of injection.

The movement-preventing unit may comprise a lock mechanism for preventing the relative displacement between the injection unit and the base or a member secured to the base. The lock mechanism may be a braking unit.

The nozzle touch force generating unit may comprise an electric motor, a conversion mechanism which converts a rotary motion of the motor into a linear motion, and a spring positioned between the injection unit and a member which is moved linearly by conversion by the conversion mechanism, so as to generate a nozzle touch force corresponding the amount of expansion or contraction of the spring.

The nozzle touch mechanism may further comprise an adjustment member protruding toward the member linearly moving from the injection unit, the protruding length of the adjustment member being adjusted to determine the amount of expansion and contraction of the spring when the spring comes into contact to the linearly moving member, so as to adjust the nozzle touch force, the adjustment member acting as the movement-preventing unit for preventing the movement of the injection unit when the adjustment member contacts to the linearly moving member.

BRIEF DESCRIPTION OF THE DRAWINGS

The above and other objects, features and advantages of the present invention will be made more apparent, from the following description of the preferred embodiments thereof, with reference to the accompanying drawings, wherein.

DETAILED DESCRIPTION OF THE INVENTION

Figure 1:
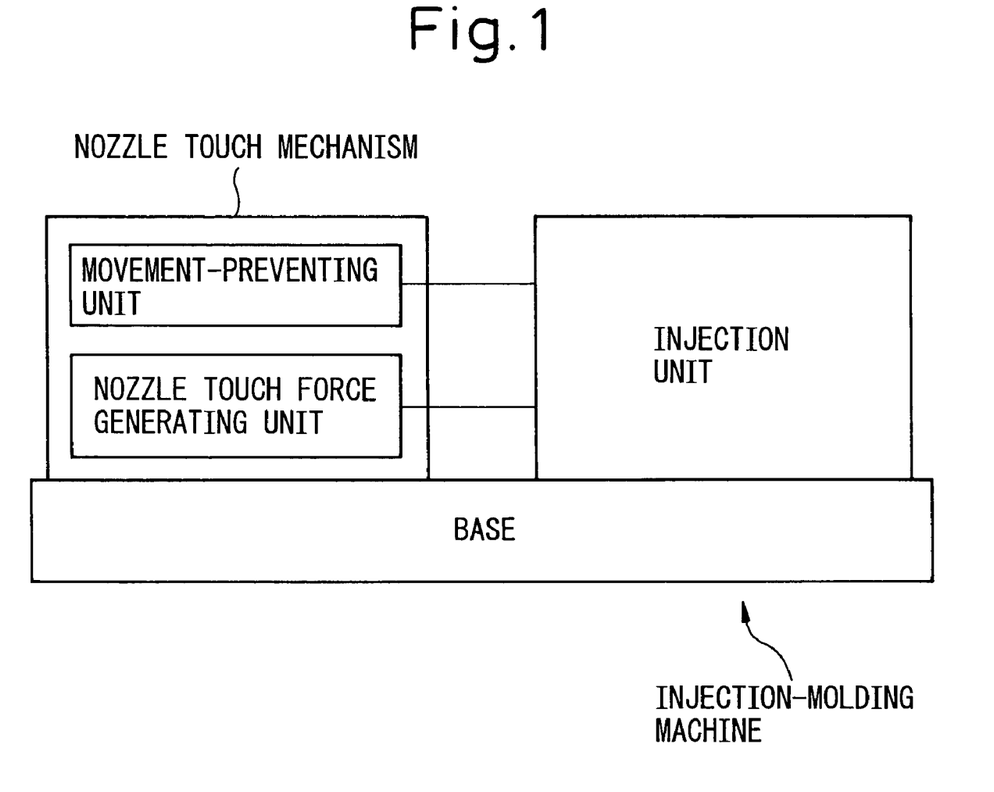
FIG. 1 is a block diagram illustrating the fundamental constitution of the present invention.

FIG. 1 is a block diagram illustrating the fundamental constitution of the invention. A nozzle touch mechanism for an injection-molding machine having a base and an injection unit arranged on the base so as to move backward and forward, includes a nozzle touch force generating unit positioned between the injection unit and the base for imparting a nozzle touch force to the injection unit, and a movement-preventing unit which substantially prevents the movement of the injection unit when a reaction force larger than the output of the nozzle touch force generating unit is imparted to the injection unit.

Figure 5:
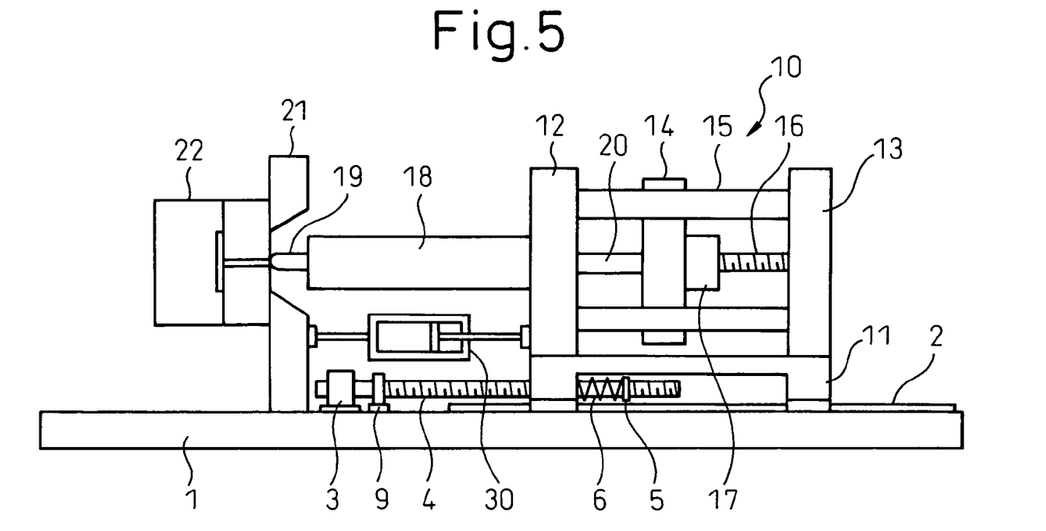
FIG. 5 is a diagram illustrating a major portion according to a first embodiment of the present invention.

FIG. 5 is a diagram illustrating a major portion according to a first embodiment of the present invention. As shown, on a rail 2 provided on the base 1 of the injection-molding machine, there is arranged a unit base 11 that constitutes a portion of the injection unit 10 so as to move backward and forward. An injection mechanism is mounted on the unit base 11 so as to be turned for the replacement and maintenance of the injection screw. The injection unit includes a front plate 12, a rear plate 13, a plurality of guide bars 15 coupling the front plate 12 and the rear plate 13 together, and a pusher plate 14 guided by the guide bars 15, and a nut 17 is secured to the pusher plate 14 so as to be screwed onto a ball screw 16 for injection. The pusher plate 14 rotatably holds an injection screw 20 that is inserted in the heating cylinder 18. A nozzle 19 is provided at an end of the heating cylinder 18, and is allowed to come in contact with, or separate away from, a metal mold 22 mounted on a stationary platen 21. A servomotor for injection (not shown) drives the ball screw 16 to advance the pusher plate 14 and the injection screw 20 thereby to inject a molten resin. The injection screw 20 is configured to rotate by a servomotor for screw rotation (not shown).

A nozzle touch force generating unit is arranged on the unit base 11. The nozzle touch force generating unit is constituted by an electric motor 3 secured to the base 1, a coupling member 9 secured to the base 1 for coupling the rotor shaft of the motor 3 to a ball screw 4 and for supporting the ball screw 4 maintaining the freedom of rotation but inhibiting its motion in the axial direction, a nut member 5 screwed onto the ball screw 4 and positioned between the legs 11a and 11b of the unit base 11, guide rods 7, 7 for guiding the nut member 5, and springs 6, 6 arranged between the nut member 5 and the leg 11a of the unit base 11 and undergoes the expansion and contraction accompanying the motion of the nut member 5. As the motor 3 is driven to rotate the ball screw 4, the nut member 5 screwed onto the ball screw 4 moves in the axial direction being guided by the guide rods 7, 7. As the nut member 5 moves forward (toward the left in FIGS. 2 and 3), the spring 6 is contracted, the unit base 11 moves forward, and the injection mechanism mounted on the unit base 11 moves forward. According to this constitution, the injection unit 10 moves forward, the nozzle 19 is brought in contact with the metal mold, the amount of expansion or contraction of the spring is detected by a sensor 8, and a nozzle touch force corresponding to the amount of the expansion or contraction is generated.

The major difference between the nozzle touch mechanism of FIG. 5 according to the invention and the conventional nozzle touch mechanism of FIGS. 2 and 3 is that the former includes a damper 30 between the stationary platen 21 and the front plate 12 of the injection unit 10. The term "damper" is a general term of a device used to decrease the magnitude of an oscillation and/or an impact by consuming energy. The damper may include devices, such as a spring, an air spring and rubber, generating a braking force corresponding to a displacement of the unit, and devices, such as a viscous damper and an electromagnetic damper, generating a braking force corresponding to a speed of the unit. The damper 30 used in the invention is the device, such as the viscous damper and the electromagnetic damper, generating a braking force corresponding to a speed of the unit. Therefore, during nozzle touch operation, when the injection unit 10 (the unit base 11) is moved forward via the spring 6 by driving the motor 3 to rotate the ball screw 4 so as to move forward the nut member 5 screwed onto the ball screw 4 and guided by the guide rod 7, the braking force of the damper 30 hardly works, because the moving speed of the unit 10 is low, such that the unit 10 can move forward and the nozzle 19 can contact to the metal mold 22. The advancement of the injection unit 10 is stopped by the contact of the nozzle 19 with the metal mold 22, however, the spring 6 may be contracted by further driving the motor 3. When the sensor 8 detects that the spring 6 is contracted to predetermined length, the motor 3 is stopped and locked. A nozzle touch force is generated corresponding to the amount of contraction of the spring 6, such that the nozzle 19 is pressed against the metal mold 22 and held in place.

In this regard, when the injection is started i.e., the injection screw 20 is moved forward to inject molten resin in the heating cylinder 18 into the metal mold 22, the force working to move back the unit 10 is generated by the inertia force at the time of acceleration of injection. If the acceleration of injection is low, the injection unit 10 is not moved because the effect of the inertia force is small. If the acceleration of injection is high, on the other hand, the nozzle touch force is deteriorated by high inertia force, however, the damper 30 generates a braking force at the moment when the unit 10 starts to move. This braking force is strong, because this injection motion is a high acceleration motion, such that the unit 10 is not moved back. In this first embodiment, the damper 30 positioned between them connects the injection unit 10 to the stationary platen 21. However, the damper 30 may be positioned between the unit 10 and other point of the base 1 or a member secured to the base 1, instead of the stationary platen 21, because the stationary platen 21 is secured to the base 1.

Figure 6:
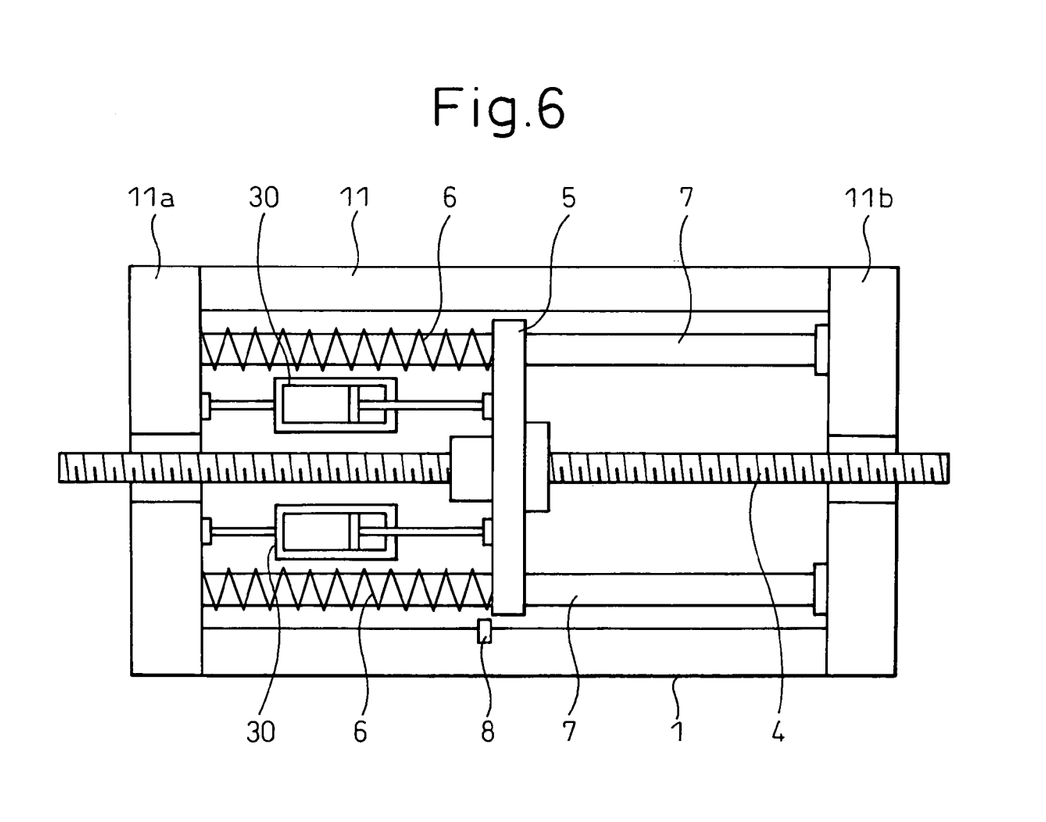
FIG. 6 is a diagram illustrating a major portion according to a second embodiment of the present invention.

FIG. 6 is a diagram illustrating a major portion according to a second embodiment of the present invention. A nozzle touch mechanism of the second embodiment includes dampers 30, 30, such as the viscous damper as described above, which are arranged parallel to the spring 6 positioned between the legs 11a and 11b of the unit base 11. The dampers 30, 30 hardly generate a braking force for low-speed motion and generate a strong braking force for high-speed motion. Other constitution of this embodiment may be the same as that of the conventional nozzle touch mechanism of FIGS. 2 and 3. In the second embodiment, similarly to the first embodiment, when the injection unit 10 (the unit base 11) is moved forward slowly via the spring 6 and the dampers 30, 30 by driving the motor 3 to move forward the nut member 5, the nozzle 19 contacts to the metal mold 22. The advancement of the injection unit 10 is stopped and, then, the spring 6 may be contracted by moving forward the nut member 5. When the sensor 8 detects that the spring 6 is contracted to predetermined length, the motor 3 is stopped and locked. After the predetermined nozzle touch force is obtained, the injection is started. Even though the injection unit 10 undergoes the force working to move back the unit 10 due to the inertia force at the time of acceleration of the injection, the unit 10 is not moved because the dampers 30, 30 prevent the high acceleration motion of the unit 10.

Figure 7:
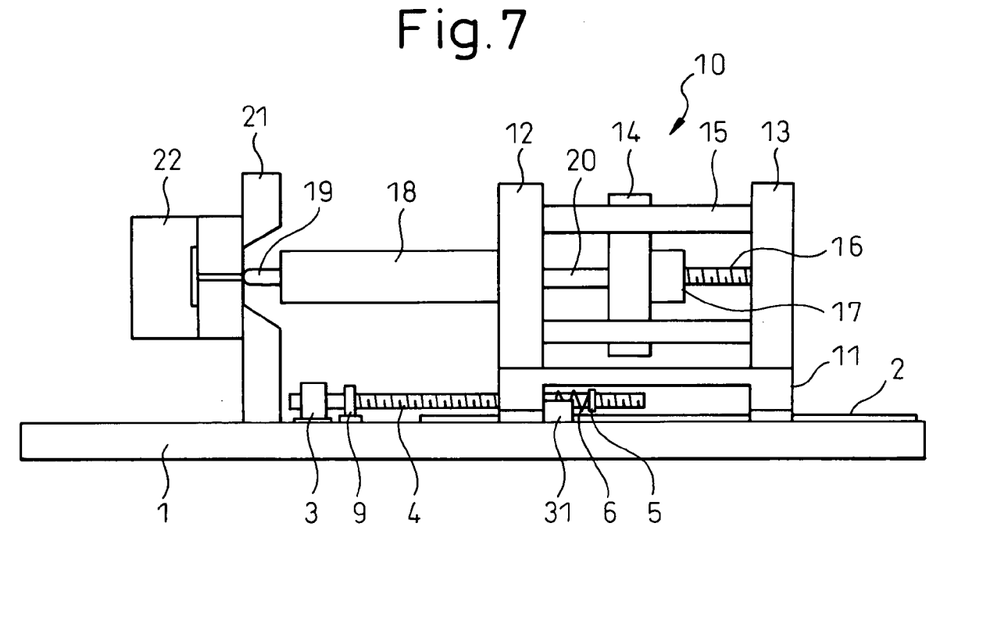
FIG. 7 is a diagram illustrating a major portion according to a third embodiment of the present invention.

FIG. 7 is a diagram illustrating a major portion according to a third embodiment of the present invention. A nozzle touch mechanism of the third embodiment includes a lock mechanism having a braking unit 31 arranged between the base 1 and the injection unit 10. That is to say, the braking unit 31 is configured to lock the base 1 to the unit base 11 of the unit 10. Other constitutions of this embodiment may be the same as that of the conventional nozzle touch mechanism of FIGS. 2 and 3. The braking unit may be secured to the unit base, for example, and brakes using a hydraulic, pneumatic or electromagnetic force, or a mechanical frictional force between the unit base and the rail or the base. Other braking units using a mechanical frictional force may be employed.

In the third embodiment, when the injection unit 10 is moved forward, by driving the motor 3, such that the nozzle 19 contacts to the metal mold 22 and the spring 6 is contracted. When the sensor 8 detects that the spring 6 is contracted to predetermined length, the motor 3 is stopped and locked and, further, the base 1 and the unit base 11 of the unit 10 are locked together by the working of the braking unit 31. Even though the injection unit 10 undergoes the force working to move back the unit 10 due to the inertia force at the time of acceleration of the injection, the unit 10 is not moved because the injection unit 10 is locked to the base 1.

Figure 8:
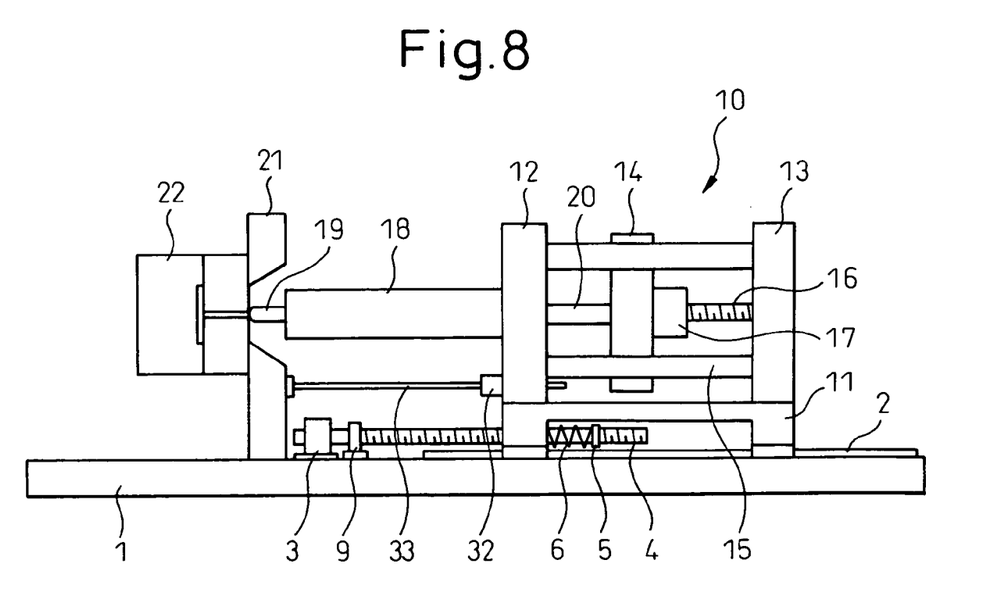
FIG. 8 is a diagram illustrating a major portion according to a fourth embodiment of the present invention.

FIG. 8 is a diagram illustrating a major portion according to a fourth embodiment of the present invention. A nozzle touch mechanism of the fourth embodiment is characterized in that the mechanism includes a braking unit 32 for locking the injection unit 10 to the stationary platen 21.

One end of a rod 33 is secured to the stationary platen 21, and the other end of the rod 33 is freely inserted into a through hole arranged on the front plate 12 of the injection unit 10. The braking unit 32 for locking the rod 33 is positioned on the front plate 12. The operation of this embodiment, until the nozzle 19 contacts to the metal mold 22 and the predetermined nozzle touch force is generated by the spring 6, may be the same as those of the above embodiments and the conventional mechanism. The motor 3 is stopped and locked in a condition in which the nozzle 19 is pressed against the metal mold 22 with the predetermined nozzle touch force, and then, the braking unit 32 is activated to lock the rod 33. Thus, the stationary platen 21 and the injection unit 10 are locked and the distance between them is maintained at a constant value. Therefore, even though the injection unit 10 undergoes the force working to move back the unit 10 due to the inertia force at the time of acceleration of the injection, the unit 10 is not moved because the injection unit 10 is locked to the stationary platen 21.

Figure 9:
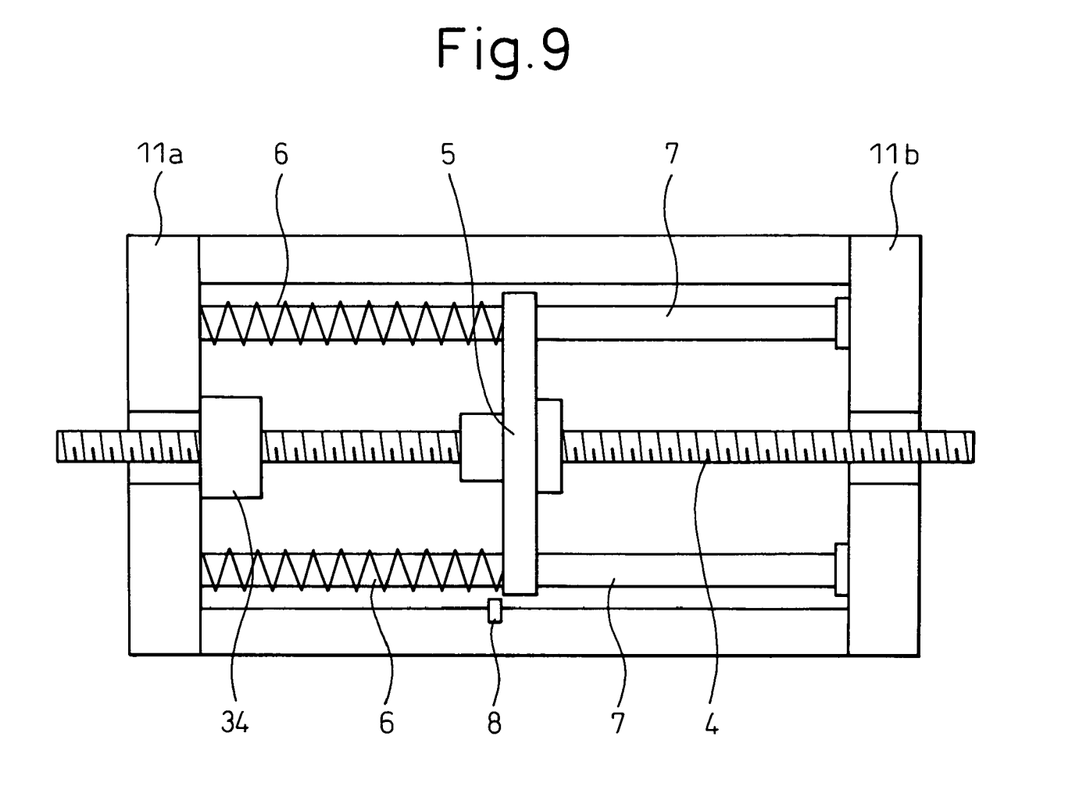
FIG. 9 is a diagram illustrating a major portion according to a fifth embodiment of the present invention.

FIG. 9 is a diagram illustrating a major portion according to a fifth embodiment of the present invention. A nozzle touch mechanism of the fifth embodiment is characterized in that a braking unit 34 is arranged on the unit base 11 of the injection unit 10 for preventing the relative movement between the unit base 11 and the ball screw 4. In the fifth embodiment, after the nozzle touch force is generated depending upon the amount of contraction of the spring 6, the ball screw 4 is locked by activating of the braking unit 34. Thus, the unit base 11 of the injection unit 10 and the ball screw 4 are integrated. Therefore, even though the injection unit 10 undergoes the force working to move back the unit 10 due to the inertia force at the time of acceleration of the injection, the unit 10 is not moved by activating the braking unit 34 because the ball screw 4 is axially secured to the base 1 by a coupling member 9 and the motor 3.

Figure 10A:
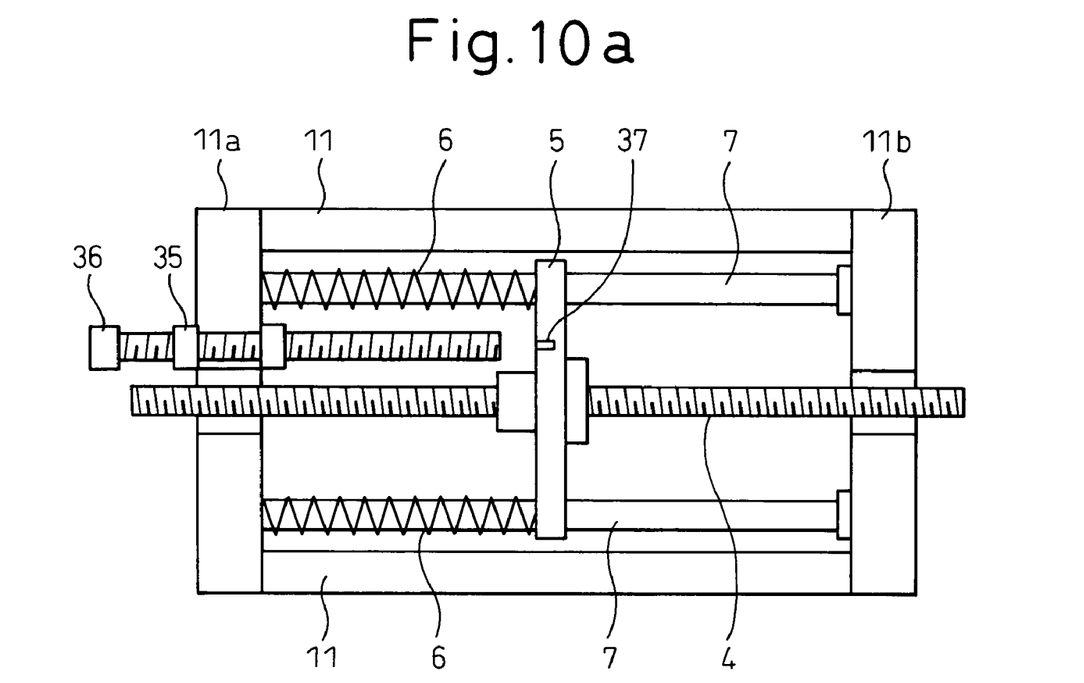
FIGS. 10a and 10b are diagrams illustrating a major portion according to a sixth embodiment of the present invention, and showing a non-nozzle touch position in which the nozzle does not contact to the metal mold and a nozzle touch position in which the nozzle contacts to the metal mold, respectively.
Figure 10B:
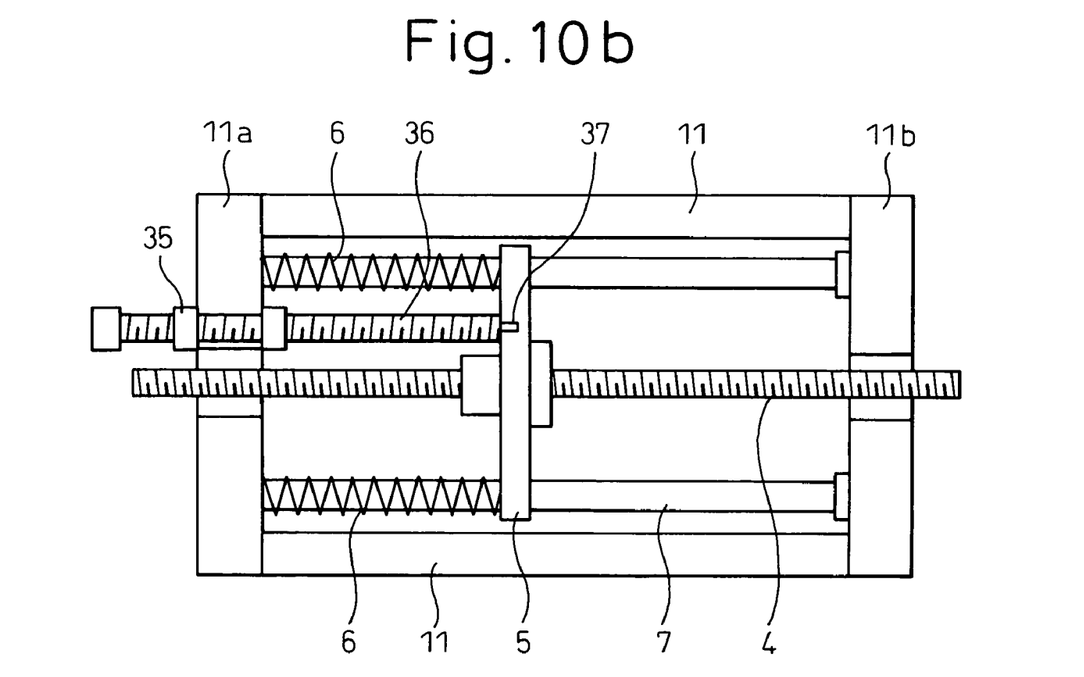

FIGS. 10a and 10b are diagrams illustrating a major portion according to a sixth embodiment of the present invention. A nozzle touch mechanism of the fifth embodiment is characterized in that the movement-preventing means for the injection unit also serves as an adjustment means of the nozzle touch force (the amount of contraction of the spring). The major difference between the nozzle touch mechanism of the embodiment and the conventional nozzle touch mechanism of FIGS. 2 and 3 is that the former includes a nut 35 mounted by welding, for example, on the leg 11a of the unit base 11 of the injection unit 10, an adjustment member or a bolt 36 onto which the nut 35 is screwed is arranged such that an axis of the bolt 36 is parallel to the expansion and contraction direction of the spring 6, and a sensor 37 on the position opposite to an end surface of the bolt 36 facing the nut member 5. Other constitution of this embodiment may be the same as that of the conventional nozzle touch mechanism of FIGS. 2 and 3. FIG. 10a illustrates a non-nozzle touch position in which the nozzle 19 does not contact to the metal mold 22, and FIG. 10b illustrates a nozzle touch position in which the nozzle 19 contacts the metal mold 22.

The amount of contraction of the spring 6 may be adjusted by adjusting the protruding length of the bolt 36 toward the nut member 5 from the leg 11a of the unit base 11 by rotating the bolt 36. That is to say, the desired nozzle touch force may be obtained by adjusting the protruding length of the bolt 36. The nut member 5 screwed onto the ball screw 4 and guided by the guide rod 7 is moved forward by driving the motor 3 to rotate the ball screw 4 and, then, the injection unit 10 is moved forward and the nozzle 19 comes into contact with the metal mold 22, as described above. After the movement of the injection unit 10 is stopped by the contact, the spring 6 is contracted, and the nozzle 19 is pressed against the metal mold 22 corresponding to the amount of contraction of the spring 6. When the sensor 37 detects that the nut member 5 contacts to the end surface of the bolt 36, the motor 3 is stopped and locked. FIG. 10b shows the position in which the nozzle touch force is generated. When the nut member 5 is moved from the position of FIG. 10a (non-nozzle touch position) to the position of FIG. 10b (nozzle touch position) such that the nut member 5 contracts the spring 6 and contacts to the end surface of the bolt 36, the spring 6 cannot be contracted. Therefore, the amount of contraction of the spring 6 which corresponds to the difference between the positions of FIGS. 10a and 10b is equivalent to the generated nozzle touch force, which means that the nozzle touch force may be adjusted by the protruding length of the bolt 36.

The injection is started when the nozzle 19 is pressed against the metal mold 22 with a predetermined nozzle touch force. Even though the injection unit 10 undergoes the force working to move back the unit 10 due to the inertia force at the time of acceleration of the injection, the unit 10 is not moved because the nut member 5 contacts to the end surface of the bolt 36 onto which the nut 35 arranged on the leg 11a of the unit base 11 is screwed.

Among the above embodiments, regarding the movement-preventing unit for preventing the movement back of the injection unit 10 by using the lock mechanism, such as braking units as shown in FIGS. 7, 8 and 9, the nozzle touch force may be gradually changed during the injection when the braking unit is "ON" wherein the nozzle touch force is not controlled. Further, the nozzle touch force may be greatly different between the conditions in which the metal mold is clamped or not, due to the tilting of the platen when the metal mold is not clamped. In order to prevent these inconveniences, the braking unit is "ON" only during an arbitrary period (e.g., during injection) of the molding cycle.

In the above embodiments of the invention, even though a reaction force larger than the output of the nozzle touch force generating unit is imparted to the injection unit, the leakage of molten resin due to the movement back of the injection unit at the time of acceleration of injection may be prevented, because the nozzle touch mechanism includes the means for preventing the movement of the injection unit.

In accordance with the nozzle touch mechanism of the invention, the leakage of the molten resin does not occur by generating a nozzle touch force slightly more than the force which is applied to the nozzle by resin pressure. Therefore, as it is allowed to minimize the nozzle touch force against the metal mold, the drop in the quality of the molded article and the decrease in the life of the metal mold are both greatly restraint.

According to the invention described in the above Japanese Patent No. 3153800, a spring and a buffer member are arranged in series between the base of the injection-molding machine and the injection unit, the shock of injection is absorbed by the buffer member, the rearward motion of the injection unit is not transmitted to the spring, and the sensor for detecting the amount of expansion or contraction of the spring is prevented from erroneously working. However, the injection unit cannot be prevented from moving back. As will be obvious from the description of FIG. 5 of Japanese Patent No. 3153800, the buffer member is a damper constituted by, for example, a spring to produce a damping force proportional to the displacement. The effect of relaxing the shock is not obtained if there is used a buffer member such as a viscous damper that produces a damping force depending upon the speed or a friction damper that produces a predetermined damping force.

The invention disclosed in Japanese Unexamined Patent Publication (Kokai) No. 10-235680 is not the one that uses the nozzle touch force generating unit that uses the spring. Therefore, the injection unit does not move back at the time of the injection. According to the invention described in Japanese Unexamined Patent Publication (Kokai) No. 10-235680, the same nozzle touch force is not produced unless the nozzle touch position is strictly at the same position. If, for example, even a small amount of foreign matter such as a resin film stays on the nozzle touch surface or if the nozzle touch surface is worn out by the slightest amount, the amount of expansion or contraction of the guide bar undergoes a change causing the nozzle touch force to be varied. Further, the nozzle and barrel undergo thermal expansion or contraction and, after all, a desired nozzle touch force is not produced.

On the other hand, in accordance with the invention, it is required merely to generate the nozzle touch force slightly more than the resin pressure, whereby the nozzle touch force does not decrease when the injection unit undergoes the force working to move the unit back at the time of acceleration of the injection, and the leakage of the molten resin is prevented. Further, an excess of nozzle touch force is not generated, therefore, the deflection of the metal mold and/or the deterioration of a parallel accuracy of the mold may be prevented.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A nozzle touch mechanism for an injection-molding machine having a base and an injection unit arranged on the base so as to move backward and forward, comprising:
    a nozzle touch force generating unit positioned between the injection unit and the base for imparting a nozzle touch force to the injection unit;
    a movement-preventing unit which substantially prevents the movement of the injection unit when a reaction force larger than the output of the nozzle touch force generating unit is imparted to the injection unit;
    wherein the movement-preventing unit is arranged in parallel to the nozzle touch force generating unit.

2. The nozzle touch mechanism as set forth in claim 1, wherein the movement-preventing unit comprises a damper positioned between the injection unit and the base or a member secured to the base for connecting the injection unit to the base or the member.

3. The nozzle touch mechanism as set forth in claim 2, wherein the damper generates the braking force corresponding to a moving back speed of the injection unit which is generated at the time of acceleration of injection.

4. The nozzle touch mechanism as set forth in claim 1, wherein the movement-preventing unit comprises a damper positioned between the injection unit and the base.

5. The nozzle touch mechanism as set forth in claim 4, wherein the damper generates a braking force corresponding to a moving back speed of the injection unit which is generated at the time of acceleration of injection.

6. The nozzle touch mechanism as set forth in claim 1, wherein the movement-preventing unit comprises a lock mechanism for preventing the relative displacement between the injection unit and the base or a member secured to the base.

7. The nozzle touch mechanism as set forth in claim 6, wherein the lock mechanism is a braking unit.

8. The nozzle touch mechanism as set forth in claim 1, wherein the nozzle touch force generating unit comprises an electric motor, a conversion mechanism which converts a rotary motion of the motor into a linear motion, and a spring positioned between the injection unit and a member which is moved linearly by conversion by the conversion mechanism, so as to generate a nozzle touch force corresponding the amount of expansion and contraction of the spring.

9. The nozzle touch mechanism as set forth in claim 8, wherein the nozzle touch mechanism further comprises an adjustment member protruding toward the member linearly moving from the injection unit, the protruding length of the adjustment member being adjusted to determine the amount of expansion and contraction of the spring when the spring comes into contact with the linearly moving member, so as to adjust the nozzle touch force, the adjustment member acting as the movement-preventing unit for preventing the movement of the injection unit when the adjustment member contacts with the linearly moving member.

* * * * *